United States Patent [19]

Kageyama

[11] Patent Number: 4,920,560
[45] Date of Patent: Apr. 24, 1990

[54] METHOD OF AUTOMATIC DIALING AND AUTOMATIC DIALING DEVICE FOR FACSIMILE APPARATUSES

[75] Inventor: Kenichi Kageyama, Hino, Japan

[73] Assignee: Kabushiki Kaisha Toshiba, Kawasaki, Japan

[21] Appl. No.: 156,888

[22] Filed: Feb. 18, 1988

[30] Foreign Application Priority Data

Feb. 18, 1987 [JP] Japan .................... 62-21296[U]

[51] Int. Cl.⁵ .................. H04M 11/00; H04N 1/32
[52] U.S. Cl. ................................ 379/100; 379/97; 379/355; 358/440
[58] Field of Search .............. 379/100, 355, 97; 358/435, 438, 440

[56] References Cited

U.S. PATENT DOCUMENTS

| | | | |
|---|---|---|---|
| 4,113,991 | 9/1978 | Gorham et al. | 379/100 |
| 4,340,783 | 7/1982 | Sugiyama et al. | 379/100 |
| 4,710,951 | 12/1987 | Itezono | 379/100 |
| 4,741,021 | 4/1988 | Kotani et al. | 379/100 |
| 4,764,951 | 8/1988 | Kotani et al. | 358/257 |

FOREIGN PATENT DOCUMENTS

| | | | |
|---|---|---|---|
| 0195258 | 9/1986 | European Pat. Off. | 379/100 |
| 0244869 | 11/1987 | European Pat. Off. | |
| 3705636 | 9/1987 | Fed. Rep. of Germany | 379/100 |
| 0216356 | 12/1984 | Japan . | |
| 0090460 | 5/1985 | Japan | 379/106 |
| 0176240 | 8/1986 | Japan . | |
| 0176241 | 8/1986 | Japan . | |
| 0203777 | 9/1986 | Japan . | |
| 0086966 | 4/1987 | Japan . | |

Primary Examiner—Jin F. Ng
Assistant Examiner—Wing F. Chan
Attorney, Agent, or Firm—Finnegan, Henderson, Farabow, Garrett and Dunner

[57] ABSTRACT

In a facsimile apparatus having an automatic dialing function, a plurality of telephone numbers are set for each abbreviated number. When the facsimile apparatus receives an abbreviated number, it automatically dials sequentially a receiving-side facsimile apparatus and/or a telephone set having corresponding telephone numbers for the abbreviated number thereby preventing a document from being left untransmitted.

2 Claims, 4 Drawing Sheets

METHOD OF AUTOMATIC DIALING AND AUTOMATIC DIALING DEVICE FOR FACSIMILE APPARATUSES

BACKGROUND OF THE INVENTION

1. Field of the Invention

This invention relates to improvements to a calling process in a facsimile apparatus having an automatic calling function.

2. Description of the Prior Art

Conventionally, when an original document is to be sent to a distant receiving station by automatic calling from a transmitting-side facsimile apparatus having an automatic calling function, first, the operator at the transmitting-side facsimile apparatus sets the document on the reader and performs predetermined keying operations. These keying operations include pressing two of ten keys for two digits, similar to abbreviated dialing in a regular key telephone system or pressing one key using a touch dialing function. A memory in the key telephone system beforehand registers telephone numbers corresponding to respective abbreviated numbers (one or two figures keyed in by two of ten), as shown in Table 1 below:

TABLE 1

| Abbreviated Numbers | Telephone Numbers |
| --- | --- |
| 01 | 0425867449 |
| 02 | 034578321 |
| 03 | 841132 |
| . | . |
| . | . |
| . | . |
| 97 | |
| 98 | |
| 99 | |

Therefore, when the above keying operations are performed, a dial pulse signal or a dial tone signal for the corresponding telephone number is sent to a telephone line, so that the transmitting-side facsimile apparatus and the receiving-side facsimile are connected via the telephone line and thereafter the read document image data is transmitted to the receiving-side facsimile apparatus.

When the transmitting-side facsimile is connected to the receiving-side facsimile, the receiving-side facsimile apparatus may not respond because it is busy, out of order, lacking recording paper or not in an automatic reception state even if dial pulses may be sent in the manner mentioned above. Therefore, in the conventional apparatus, when the receiving station does not respond, the automatic calling operation is adapted to be repeated a plurality of times at predetermined intervals of time.

According to such conventional system, however, when the receiving station is long busy or out of order, or a recipient is absent and recording paper is not supplemented, it is eventually impossible to transmit the document to the receiving station. If the operator always monitors the transmission state of the facsimile apparatus, she can directly know that the document has not been transmitted. However, the operator usually does not always monitor the facsimile apparatus. Especially when a document is sent is a designated time using a timer, or when image data in the document is temporarily written into a memory in the facsimile apparatus and then transmitted, it is usual for the operator to set the document and then leave the facsimile apparatus. Therefore, it may happen that the operator does not notice that the document has not been transmitted until the next day or a considerable time has elapsed. If the document is especially an urgent one, work would not well forward.

SUMMARY OF THE INVENTION

It is an object of this invention to provide a facsimile apparatus which minimizes the occurrence of an event such as an document being left untransmitted.

According to this invention, a facsimile apparatus comprises: memory means having a plurality of abbreviated numbers for registering therein a plurality of telephone numbers including that or those of one or more receiving-side facsimile apparatuses; means for selecting an abbreviated telephone number coinciding with an input abbreviated number among the plurality of abbreviated numbers registered in the memory means and for leading from the memory means a plurality of telephone numbers corresponding to the selected abbreviated number; and means for automatically dialing receiving-side devices having corresponding read telephone numbers of the plurality sequentially in a predetermined sequence.

According to such structure of this invention, the next receiving-side candidate telephone number is automatically dialed even if the receiving side does not respond to the automatic dialing of the first telephone number, so that the probability of establishing a communication circuit between the transmitting side and the receiving side is very high compared to the conventional technique to thereby avoid an undesirable even in which a document is left untransmitted.

DESCRIPTION OF THE PREFERRED EMBODIMENT

Figure 1:
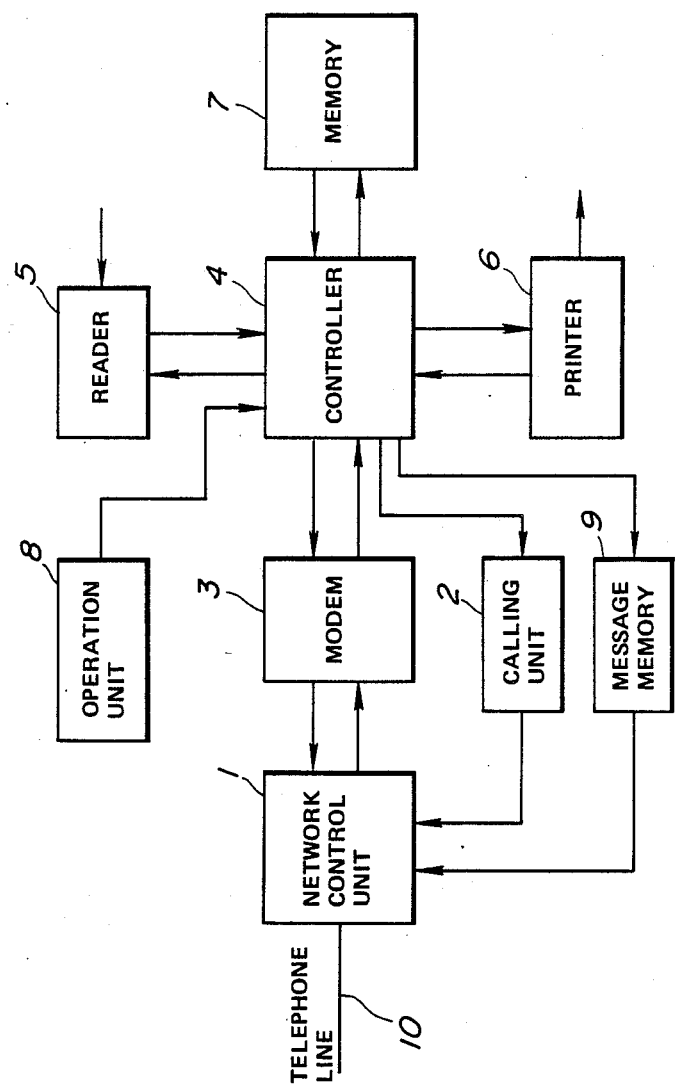
FIG. 1 is a block diagram showing one embodiment of a facsimile apparatus according to this invention.

FIG. 1 is a block diagram showing one embodiment of a facsimile apparatus according to this invention. A network control unit 1 controls the connection of a line switching network for outgoing call, restoration, incoming call, etc. a calling unit 2 generates dial pulses. A modem 3 modulates and demodulates transmit and receive signals. A control unit 4 controls the transmission and reception of image data, automatic recalling, etc.; A reader 5 reads a document A printer 6 received image data, various information or the like on recording paper and outputs same. A memory 7 stores image data, telephone numbers, etc. An operation unit 8 is used by an operator to key in various data and operation commands, etc. A speech memory 9 provides various messages. A telephone line 10 is also provided.

Table 2 below shows the correspondence of abbreviated numbers stored in memory 7 of FIG. 1 to telephone numbers.

TABLE 2

| Abbreviated Numbers | registered telephone numbers | | | |
| --- | --- | --- | --- | --- |
| 01 | a | Tel No of 1st receiving fax | b | Tel No of 2nd receiving fax |
|  | c | Tel No of receiving tel | d | Tel No of transmitting tel |
| 02 | a |  | b |  |
|  | c |  | d |  |
| . | . |  | . |  |
| . | . |  | . |  |
| . | . |  | . |  |
| 98 | a |  | b |  |
|  | c |  | d |  |
| 99 | a |  | b |  |
|  | c |  | d |  |

In this embodiment, one abbreviated number (of two digits, in this case) can have four telephone numbers registered in a, b, c and d and the automatic dialing sequence has the priority order of a, b, c and d. Namely, when the transmitting station cannot communicate by automatic dialing with the receiving station using the telephone number in a, an automatic dialing operation is performed on the receiving station using the telephone number in b. Similarly, an automatic dialing operation may be performed sequentially using the telephone numbers in c and d in this order.

Figure 2:
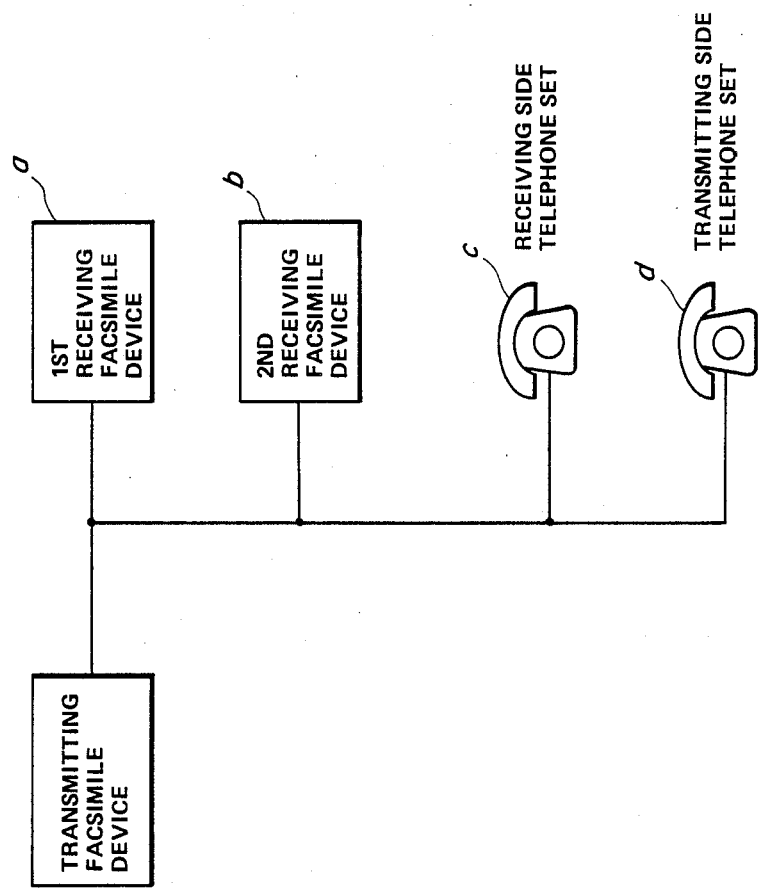
FIG. 2 is a block diagram illustrating the contents of telephone numbers registered for one abbreviated number.

While the four telephone numbers may be set as any number by making proper arrangements with the receiving station, the following telephone numbers are set in this embodiment, as shown in table 2 and in FIG. 2;

a. the telephone number of a facsimile apparatus (first facsimile apparatus) at the receiving station;

b. the telephone number of another facsimile apparatus (second facsimile apparatus) at the receiving station;

c. the telephone number of a telephone set at the receiving station; and d. the telephone number of a calling telephone set at the transmitting station.

The telephone number of a telephone set registered in c is used for transmitting a speech message such as "Your facsimile apparatus is out of order". The telephone number registered in d is used for reporting a predetermined speech message indicating the result of communications such as "Your document could not be transmitted" to the caller at the transmitting station. The speech messages are preselected at message memory 9.

Figure 3:
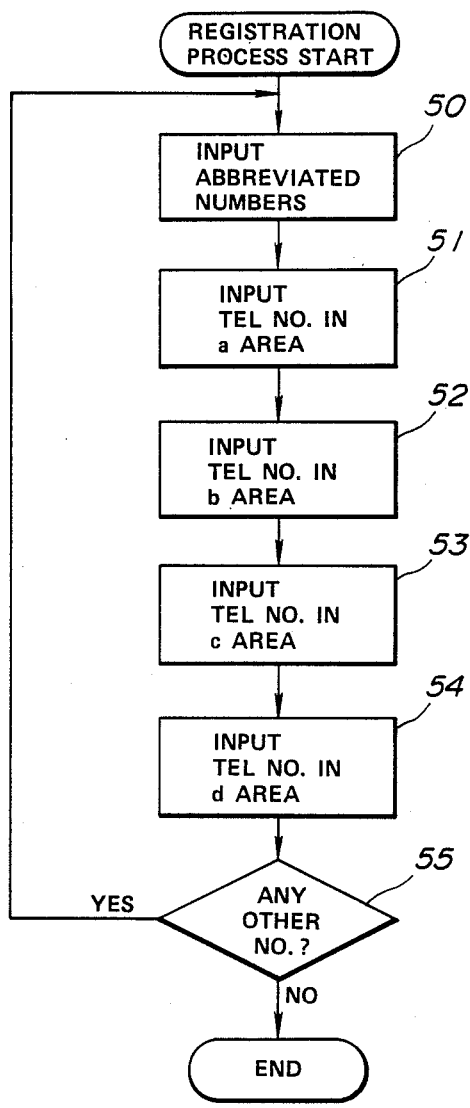
FIG. 3 is a flowchart showing one example of the registering process.

The specific operation of the above apparatus will now be described with reference to the flowchart of FIGS. 3 and 4.

REGISTRATION

First, the procedure for registration will now be described with reference to FIG. 3. The operator manipulates the operation unit 8 properly and informs control unit 4 that the apparatus should now be in a registration mode. The operator then presses keys of required abbreviated numbers, and four telephone numbers corresponding to each of the abbreviated numbers sequentially by pressing the corresponding keys a, b, c and d to register the four telephone numbers for each abbreviated numbers (steps 50-54). In this registration, the telephone number of an alternative facsimile apparatus as well as the telephone number of a proper telephone set at the receiving station is input by making arrangements with the receiving station, together with the telephone number of a proper telephone set at the transmitting station which transmits the result of the communications by speech message.

Thereafter, by similar operations, four telephone numbers are registered for each of required other abbreviated numbers (step 55).

Calling

A calling operation will now be described with reference to FIG. 4. In automatic dialing, the operator sets an original document on reader 5 (step 101). Thereafter, she keys in, at operation unit 8, an abbreviated number (of two figures, in this example) corresponding to the telephone number of a receiving-side facsimile apparatus to which the document is to be sent. When control unit 4 ascertains that the abbreviated number is input (step 102), it reads from memory 7 the telephone number having a priority order number 1 among the four telephone numbers corresponding to the input abbreviated number, namely, the telephone number of the first facsimile apparatus stored in the area a, and outputs the read telephone number to the calling unit 2 (step 103). By this, the calling unit 2 sends dial pulses corresponding to that telephone number via network control unit 1 to telephone line 10 (step 104). Control unit 4 then checks for a response from the distant receiving station (step 105). If there is a response, the control unit 4 executes a regular facsimile transmitting procedure by which the image information on the document is transmitted to the receiving station and ends the procedure (step 111). If there is no response from the receiving station, control unit 4 determines whether redialing has been performed a predetermined number of times (step 106). If not, call dialing is again performed on the receiving-side facsimile apparatus after a predetermined waiting time has passed (step 104). If the receiving station does not respond, the control unit 4 repeats such procedures a predetermined number of times to thereby perform a dialing operation on the receiving facsimile apparatus a predetermined number of time. In this case, the number of redialing operations is preset, for example, to 3 or 4.

If the receiving-side facsimile apparatus does not respond even by the plurality of dialing operations, control unit 4 reads the telephone number having a priority order number 2, namely, the telephone number of the second facsimile apparatus stored in the area b (step 107) and delivers this number to the calling unit 2, which then sends dial pulses corresponding to that telephone number via network control unit 1 to telephone line 10 (step 108). In a manner similar to that mentioned above, control unit 4 performs an automatic dialing operation using the second telephone number candidate a predetermined number of times (steps 108, 109 and 110). If the receiving station responds to those automatic dialing operations, the document is transmitted to the second facsimile apparatus (step 111). However, if there is no response from the second facsimile apparatus, control unit 4 shifts the procedure to step 112 where control unit 4 determines whether a warning has been issued. If so, control unit 4 ends the procedures. If not, control passes to step 113 where control unit 4 reads from memory 7 a telephone number having a priority order number 3, namely, the telephone number, stored in the area c, of a predetermined telephone set at the receiving station, and delivers the read number to calling unit 2, which then sends dial pulses corresponding to that telephone number via network control unit 1 to telephone line 10 (step 114). At step 115 control unit 4 determines whether the distant receiving station telephone is busy. If no, and if the transmitting station is connected to the receiving station telephone, control unit 4 drives speech memory 9 to cause same to transmit a predetermined present speech message such as the following via network control unit 1 and telephone line 10 to the receiving station telephone (step 121):

"This is OO, your facsimile is out of order and transmission is impossible".

By this message, the operator at the receiving station can know that the first and second facsimile apparatus at the receiving station are out of order or busy and return these facsimile apparatus to a respondable state.

When the procedure at step 121 ends, control unit 4 shifts the procedure to step 103 where control unit 4 again performs an automatic dialing operation on and a facsimile transmission to the first and second facsimile apparatus sequentially at the receiving station as in the previous manner (steps 103–110). Therefore, even if the first and second facsimile apparatus at the receiving station cannot respond due to being out of order or for other reasons in the previous automatic dialing, there is a large probability that the operator at the receiving station has set the facsimile apparatus in a respondable state at the receiving station by hearing the speech message, so that it is substantially ensured that the document can be transmitted to the receiving station by automatic redialing of the first and second facsimile apparatus. If the first and second facsimile apparatus do not respond even if the procedures at steps 103–110 are again taken, the procedure is shifted to step 112 where it is ended.

If the distant receiving-side telephone is busy at step 115, control unit 4 tries to perform an automatic dialing operation on the receiving station telephone a predetermined number of times in a number similar to that mentioned above. If the transmitting station cannot be connected to the receiving station telephone even by the predetermined number of automatic dialing operations (step 116), control unit 4 reads from memory 7 a telephone number having a priority order number 4, namely, the telephone number of a telephone related to the operator at the transmitting station (step 117), and delivers the read number to calling unit 2, which then generates dial pulses corresponding to the telephone number of the transmitting station telephone via network control unit 1 to telephone line 10 (step 118). Control unit 4 then checks whether the telephone related to the transmitting station is bury (step 119). If so, control unit 4 performs an automatic dialing operation on the transmitting station telephone a predetermined number of times. When the transmitting station telephone responds to these automatic dialing operations, control unit 4 drives speech memory 9 to transmit a predetermined speech message such as "The document cannot be transmitted" via network control unit 1 and telephone line 10 to the operator's telephone set at the transmitting station (step 121).

In this way, after control unit 4 has transmitted the message to the operator at the transmitting station, it again executes the procedures at steps 103–110 to try to transmit the document to the first and second facsimile apparatus at the receiving station and ends the procedure. If the facsimile apparatus at the transmitting station cannot be connected to the telephone set at the transmitting station even by the predetermined number of automatic dialing operations on the telephone at the transmitting station, the determination at step 120 becomes YES and control unit 4 ends these procedures.

In summary, according to this particular embodiment, if the first facsimile apparatus at the receiving station does not respond, the second facsimile apparatus at the receiving station is called. If the second facsimile device does not respond either, a recipient at the receiving station is called, informed that here facsimile apparatus is out of order and requested to put the facsimile devices in a respondable state. Therefore, it is substantially ensured that a document is transmitted to the receiving station to thereby prevent the document from being left untransmitted as is the case with the prior art. If the receiving station does not respond even if the above operations are performed, the called at the transmitting station is called and informed that the document cannot be transmitted, so that the caller can know that fact in a short time and can take the next measures to thereby perform her work smoothly.

According to this invention, the above embodiment may be modified in various forms. While, for example, abbreviated numbers are shown as including two figures in the above embodiment, the invention is not limited to it. An abbreviated number of one figure may be employed for one-tough dialing. Furthermore, any abbreviated number of three or four digits or a combination of alphabetical characters may be used.

An appropriate waiting time must preferably pass between adjacent redialing operations. There will be a larger probability of a response being received from the receiving station if redialing is performed a predetermined waiting time after the receiving station is found to be busy.

While in the above embodiment the number of redialing operations is shown as being set beforehand, the operator may set it to any desired number.

Figure 4:
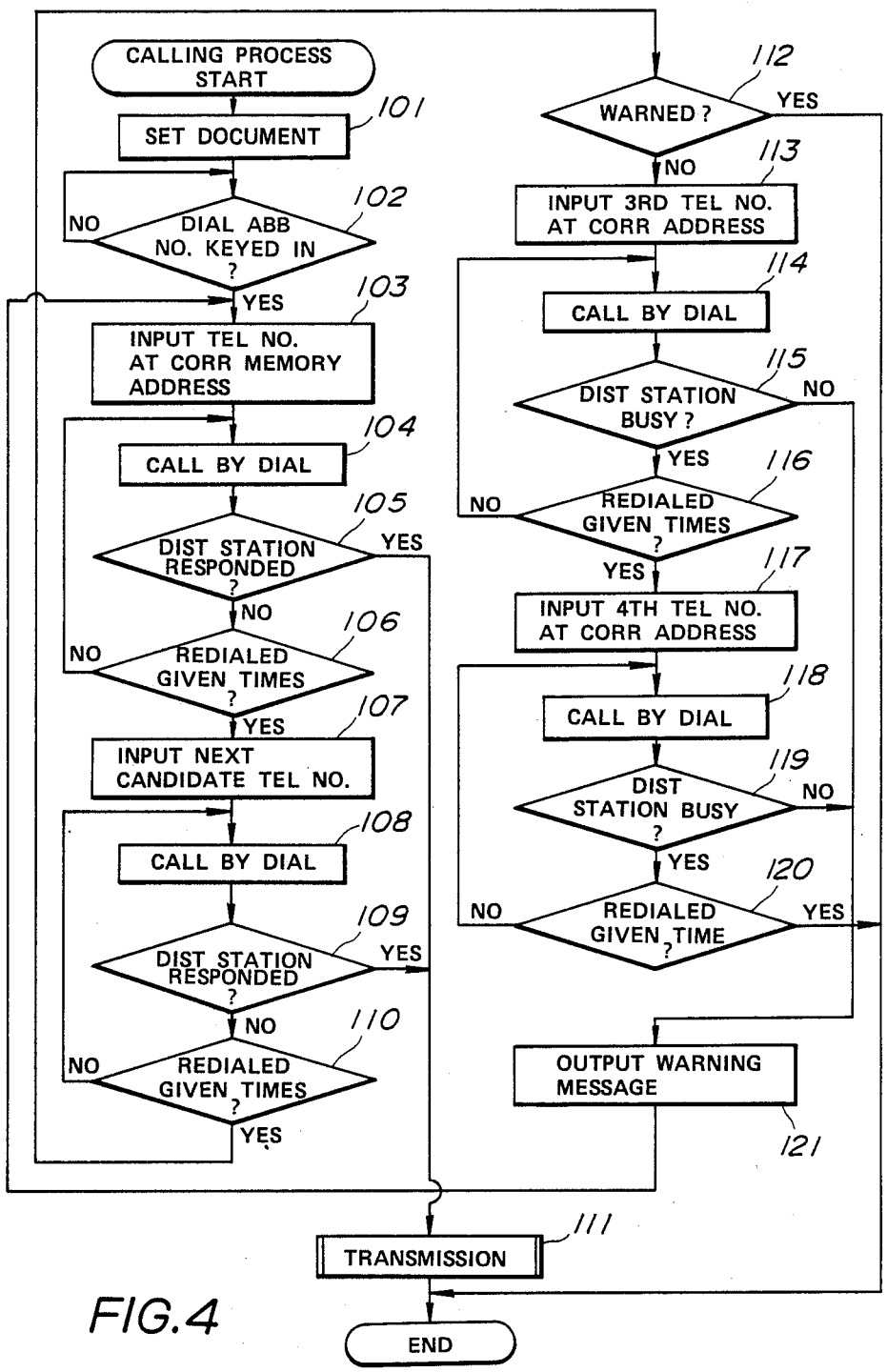
FIG. 4 is a flowchart showing one example of an automatic dialing process.

When the procedure shifts via step 120 to step 121 in the flow chart of FIG. 4, it may end immediately after the processing at step 121 has ended.

The number of telephone numbers which can be set for one abbreviated number is optional. The contents of the telephone numbers stored are optional, for example, may all be the telephone numbers of the facsimile apparatus at the receiving station. The priority order may optionally be changed, for example, to the order of the first facsimile apparatus, telephone set receiving station, second facsimile apparatus and telephone set at the receiving station.

While in the above embodiment a speech message is shown as being transmitted via a telephone set to the operator at the transmitting station only when it is impossible to perform a normal facsimile transmission with facsimile apparatus at the receiving station, a speech message to the effect that a normal facsimile transmission has ended may be transmitted to the operator at the transmitting station in that case.

What is claimed is:

1. A method of automatic dialing for facsimile apparatuses, comprising the steps of:
   registering, in a memory, a plurality of abbreviated numbers;
   storing, in said memory, telephone numbers of a first and second facsimile apparatus of a receiving side, of a predetermined receiving side telephone set, and of a predetermined calling side telephone set, for each of the plurality of abbreviated numbers;
   selecting one of the stored abbreviated numbers coinciding with an input abbreviated number;

reading four telephone numbers corresponding to the selected abbreviated number, said four telephone numbers including said telephone numbers of the receiving side's first facsimile apparatus, of the receiving side's second facsimile apparatus, of the receiving side telephone set, and of the calling side telephone set;

first, automatically dialing the corresponding telephone number of the receiving side's first facsimile apparatus and confirming a response thereto;

transmitting predetermined picture image data to the receiving side's first facsimile apparatus when a response is received at the first automatically dialing step;

second, automatically dialing the corresponding telephone number of the receiving side's second facsimile apparatus and confirming a response thereto when no response is received at the first automatically dialing step;

transmitting predetermined picture image data to the receiving side's second facsimile apparatus when a response is received at the second automatically dialing step;

third, automatically dialing the corresponding telephone number of the receiving side telephone set and confirming a response thereto when no response is received at the second automatically dialing step;

transmitting to the receiving side telephone set a first voice message indicative of an abnormality at the receiving side's first and second facsimile apparatuses when a response is received at the third automatically dialing step;

fourth, automatically redialing, after the voice message transmission step, the corresponding telephone number of the receiving side's first facsimile apparatus and confirming a response thereto;

transmitting predetermined picture image data to the receiving side's first facsimile apparatus when a response is received at the fourth automatically redialing step;

fifth, automatically redialing the corresponding telephone number of the receiving side's second facsimile apparatus and of confirming a response thereto, when no response is received at the fourth automatically redialing step;

transmitting predetermined picture image data to the receiving side's second facsimile apparatus when a response is received at the fifth automatically redialing step;

sixth, automatically dialing the corresponding telephone number of the calling side telephone set and confirming a response thereto, when no response is received at the third automatically dialing step; and transmitting to the calling side telephone set a second voice message indicative of an abnormal facsimile communication when a response is received at the sixth automatically dialing step.

2. A method of automatic dialing for facsimile apparatus, comprising the steps of:

registering, in a memory, a plurality of abbreviated numbers;

storing, in said memory, telephone numbers of a first and second facsimile apparatus of a receiving side, and of a predetermined receiving side telephone set, for each of the plurality of abbreviated numbers;

selecting one of the stored abbreviated numbers coinciding with an input abbreviated number;

reading three telephone numbers correspond to the selected abbreviated number, said three telephone numbers including said telephone numbers of the receiving side's first facsimile apparatus, of the receiving side's second facsimile apparatus, and of the receiving side telephone set;

first, automatically dialing the corresponding telephone number of the receiving side's first facsimile apparatus and confirming a response thereto;

transmitting predetermined picture image data to the receiving side's first facsimile apparatus when a response is received at the first automatically dialing step;

second, automatically dialing the corresponding telephone number of the receiving side's second facsimile apparatus and confirming a response thereto when no response is received at the first automatically dialing step;

transmitting predetermined picture image data to the receiving side's second facsimile apparatus when a response is received at the second automatically dialing step;

third, automatically dialing the corresponding telephone number of the receiving side telephone set and confirming a response thereto when no response is received at the second automatically dialing step;

transmitting to the receiving side telephone set a first voice message indicative of an abnormality at the receiving side's first and second facsimile apparatuses when a response is received at the third automatically dialing step;

fourth, automatically redialing, after the voice message transmission step, the corresponding telephone number of the receiving side's first facsimile apparatus and confirming a response thereto;

transmitting predetermined picture image data to the receiving side's first facsimile apparatus when a response is received at the fourth automatically redialing step;

fifth, automatically redialing the corresponding telephone number of the second receiving side facsimile apparatus and of confirming a response thereto, when no response is received at the fourth automatically redialing step; and transmitting predetermined picture image data to the receiving side's second facsimile apparatus when a response is received at the fifth automatically redialing step.

* * * * *